United States Patent [19]

Brusadin

[11] 4,219,222
[45] Aug. 26, 1980

[54] RAPID COUPLING AND UNCOUPLING JOINT FOR FLEXIBLE PIPES

[75] Inventor: Giacomo Brusadin, Pordenone, Italy

[73] Assignee: Uniflex S.p.A., Montereale, Italy

[21] Appl. No.: 908,635

[22] Filed: May 23, 1978

[30] Foreign Application Priority Data

May 23, 1977 [IT] Italy .............................. 82523 A/77

[51] Int. Cl.² ......................................... F16L 37/12
[52] U.S. Cl. .................................... 285/8; 285/174;
285/248; 285/315; 285/319; 285/423;
285/DIG. 22
[58] Field of Search ................... 285/315, DIG. 22, 8,
285/314, 317, 423, 319

[56] References Cited

U.S. PATENT DOCUMENTS

| | | | |
|---|---|---|---|
| 3,468,562 | 9/1969 | Chow et al. | 285/423 X |
| 3,847,393 | 11/1974 | Busselmeier | 285/321 X |
| 3,873,062 | 3/1975 | Johnson et al. | 285/317 X |

FOREIGN PATENT DOCUMENTS

| | | | |
|---|---|---|---|
| 1912316 | 9/1970 | Fed. Rep. of Germany . | |
| 2029738 | 12/1971 | Fed. Rep. of Germany | 285/174 |
| 1775302 | 10/1973 | Fed. Rep. of Germany . | |
| 1455850 | 9/1966 | France | 285/317 |
| 1066637 | 4/1967 | United Kingdom . | |

Primary Examiner—Thomas F. Callaghan
Attorney, Agent, or Firm—Wenderoth, Lind & Ponack

[57] ABSTRACT

A rapid coupling and uncoupling joint includes a male part having an outer surface with an annular groove, and a female part having an inner surface dimensioned to receive the male part. The female part has radially extending therethrough a plurality of holes. A control ring includes an annular element positioned externally of and surrounding the female part and displaceable axially only with respect thereto. The annular element has integral with an inner surface thereof, at positions adjacent a first end thereof facing the male part, a plurality of flexible tangs including radially inwardly extending first portions and second portions extending axially from the first portions away from the male part. The tangs have integral therewith a plurality of locking elements positioned to extend through the holes in the female part and into the annular groove in the male part when the male part is inserted into the female part, to thereby lock the male part in the female part. The annular element has integral with the inner surface thereof elastic members positioned to elastically abut the female part when the male part is locked therein and to urge the annular element in a first axial direction toward the male part. The annular element, the tangs, the locking elements and the elastic members are formed as a single integral piece of molded plastic material.

8 Claims, 13 Drawing Figures

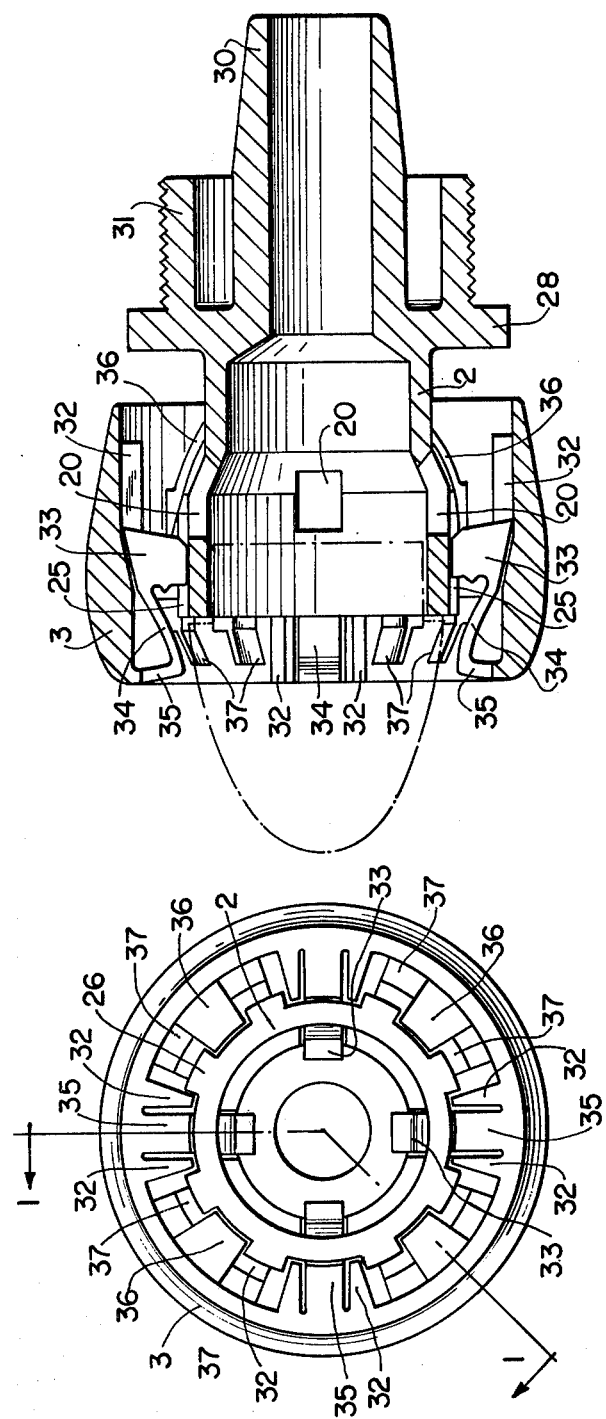

RAPID COUPLING AND UNCOUPLING JOINT FOR FLEXIBLE PIPES

BACKGROUND OF THE INVENTION

The present invention relates to a joint consisting of two parts, a male part and a female part, which makes it possible to couple the ends of two pipes, at least one of which is flexible, the coupling being affected rapidly and automatically through a simple insertion of the male part into the female part, as well as to uncouple, likewise rapidly, the two parts through the manual operation of a ring arranged externally on the female part.

Joints of this kind are widely known and used in various fields, e.g., for connecting electrical household machines, such as washers, dishwashers and the like, to feeding water pipes. A particularly broad use is found in gardening, where flexible pipes are used for feeding water to various types of devices, e.g., sprinklers and the like.

A large portion of such joints comprises elements of spherical or other shape, that are arranged in various ways in one of such parts, usually in the female part, and engage an annular groove provided in the other part, usually in the male part, thus securing the coupling of the parts. Both for coupling and also the uncoupling it is normally necessary to operate a ring usually arranged on the female part. Some solutions also provide the possibility of automatic coupling obtained simply by inserting one part into the other, while uncoupling always requires the operation of a special ring.

One of such solutions is described in German Pat. No. P 1,775,302 in the name of Kupex A. G., intended especially for use in gardening. A second such solution is described in British Pat. No. 1,066,637 of Hoover Limited, concerning the attachment of a flexible pipe to a vacuum cleaner.

Such embodiments, while solving the problem of effecting the coupling rapidly and automatically simply by inserting the male part into the female part, providing a secure reciprocal fastening of the parts and effecting the uncoupling by acting ordinarily with one hand on a special release ring, are associated with various disadvantages. The joint of German Pat. No. P 1,775,302 is very complex in structure, both when provided with a rotatable release ring and also when provided with a longitudinally displaceable release ring. Actually, it provides a series of release elements freely inserted into suitable recesses, that also require positioning tangs or springs and certainly cause difficulties in assembly. Besides, the ring requires a spring, which is an element separate from the ring and which may be a torsion spring or a compression spring in accordance with the two embodiments. The complexity of structure and assembly results in a reduced reliability even under normal operating conditions. However, especially when used for irrigation, i.e., with pipes in contact with the soil or placed underground, such joint is subjected to the entry of soil and dirt, which readily plugs up the recesses within which it is necessary to shift and operate the locking and control elements, such recesses being very small in dimensions, so that any operation of such joint becomes difficult or even impossible.

British Pat. No. 1,066,637 substantially differs from the above-mentioned German Pat. No. P 1,775,302 only through a different structural shape, which is more suitable for the object intended, namely, the coupling of a flexible pipe to a vacuum cleaner element. However, the operational principle is practically the same. In fact, such joint is likewise provided with elastic cam elements that are feely inserted between the control ring and the male part, such elements having an inclined surface, so as to allow the insertion and automatic coupling of the male part in the female part, and a surface which effects a seal in an annular groove provided in the female part. Besides, there is provided also a sealing ring, arranged at the end of the male part and effecting a seal between the latter and the ring for controlling uncoupling, and another ringtype sealing element arranged on the female part and effecting seal between the latter and the said control ring. There are no substantial practical differences that could not be overcome by an average technician in order to derive from this joint the solution of the German Pat. No. P 1,775,302, which is mentioned above. Therefore, also the solution of the British patent is associated with all the disadvantages already mentioned in regard to the German patent. Besides, as mentioned in the patent itself, there is required a considerable precision in manufacturing the various components with very narrow tolerances. In fact, in order to effect the coupling and also the uncoupling in some cases where such structural tolerances are not observed, there is required a double action with two hands, one for handling the control ring and one for acting at the same time in a suitable manner on the male part.

SUMMARY OF THE INVENTION

The object of the present invention thus consists in providing a joint consisting of a known male part and a known female part, that allow an automatic and rapid coupling, obtained by simply inserting the male part into the female part, and a likewise rapid uncoupling obtained by acting on a ring arranged externally on the female part, which is made of a minimal number of parts, so as to allow a simple and rapid assembly, and which is completely reliable.

Such joint is characterized in that the control ring arranged on the female part comprises both elastically movable inserts that secure the linking of the parts and also elastic elements that hold such ring in the locking position.

It is obvious that the new proposed solution represents not only a reduction in the number of structural elements, which is the greatest possible since a single part takes care of all the functions required of such a joint, but also realizes above all the objects stated while allowing further definite advantages. In fact, the control ring is simpler in regard to structure, as it does not contain undercuts and can be obtained by injection molding of plastic in a single die movement. The central ring cannot be rendered useless by the entry of dirt, as it does not contain blind recesses. On the other hand, recesses of this kind are present in the various known and cited solutions and constitute a technical problem which is the source of the most serious disadvantages in the operation of the joints described therein.

Besides, the elastic portions of the movable inserts for locking the joint as well as of the elements for positioning the ring are stressed only to a very low extent while securing a perfect operation.

BRIEF DESCRIPTION OF THE DRAWINGS

The present invention is described in more detail below merely by way of a nonrestictive example and with reference to the attached drawings, wherein:

FIG. 3 is a frontal view from the coupling portion of the female part equipped with the control ring, FIG. 4 is a section showing the use of the control ring on the main element of the female part.

DETAILED DESCRIPTION OF THE INVENTION

As shown in FIGS. 1 and 9-12, a male part 1 comprises a threaded connection, which allows coupling, e.g., to a faucet or an implement such as a water brush, sprinkler and the like, while the female part comprises a known end for its connection to the end of a flexible pipe.

Of course, the arrangement of the threaded connection and the end used for the attachment to the flexible pipe may be inverted, or the male part and the female part may both be provided with ends for effecting attachment to flexible pipes.

Figure 1:
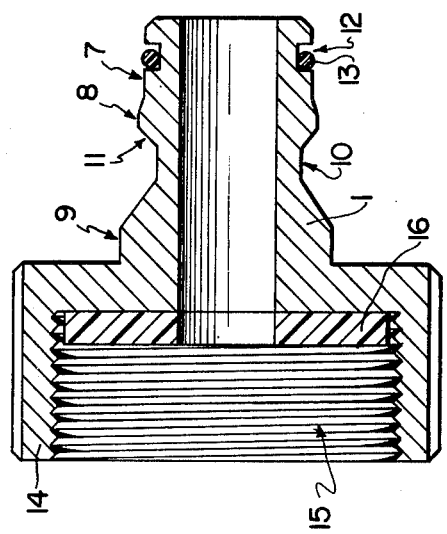
FIG. 1 is a longitudinal axial section through the male part of the joint of the invention.
Figure 6:
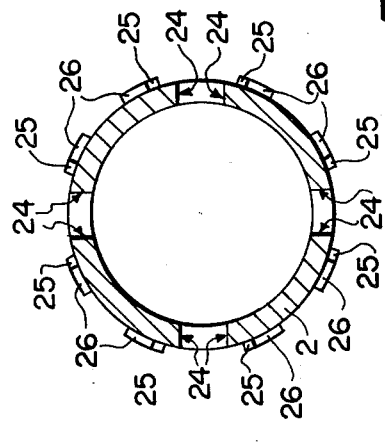
FIG. 6 is a section along the line II—II of FIG. 5 showing the female part.
Figure 8:
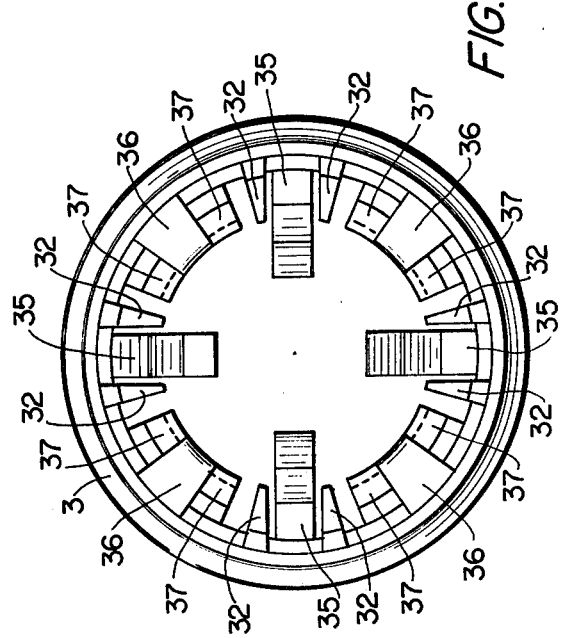
FIG. 8 is a frontal view of the ring of FIG. 7 seen from the insertion portion.
Figure 5:
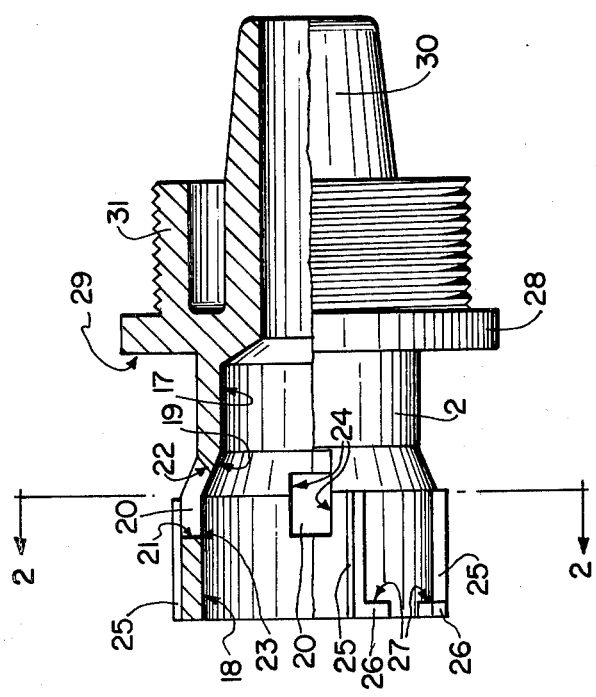
FIG. 5 is a longitudinal view in partial section of the body of the female part.
Figure 7:
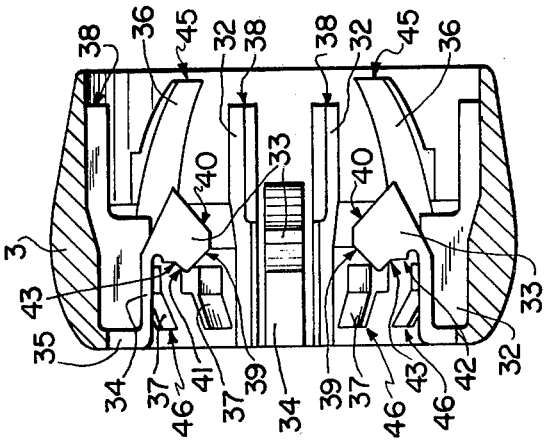
FIG. 7 is an axial section through the control ring.

The following are the basic components of the joint of the invention the male part illustrated in FIG. 1, the inner element of the female part illustrated in FIGS. 5 and 6 and the control ring to be positioned on such inner element of the female part, illustrated in FIGS. 7 and 8.

It should be noted the the reference numerals are completely indicated only where necessary.

With particular reference to FIG. 1 it is noted that element 1 form the male part of the joint and comprises a first cylindrical section 7 of relatively small diameter, including an annular groove 12 containing an inserted sealing ring 13, a second section 8, which is likewise cylindrical, joined to first section 7 and possessing a slightly larger diameter, a third cylindrical section 9 having a diameter larger than 7 and 8, an annular groove 10 provided between sections 8 and 9 and including a frontal inclined surface 11 to be engaged by locking elements that will be described below, an element 14 including an inner threaded portion 15 and a gasket 16, that constitute a threaded attachment, as mentioned above, for connecting the male part to a faucet or to an implement.

With particular reference to FIGS. 5 and 6, there is shown an inner element 2 of the female part into which one is to insert element 1 of the male part and on which one should apply the control ring. Element 2 possesses an inner cylindrical area 17 having a diameter corresponding to the diameter of section 7 of element 1 of the male part, wherein the male part will effect seal by means of sealing ring 13, and a likewise internal cylindrical area 18 situated in front of area 17 and joined to it by means of a conical portion 19, area 18 having a diameter larger than area 17 and corresponding to section 9 of the male part. Element 2 is provided with through holes 20 arranged radially and possessing a flat frontal surface 21 arranged perpendicularly to the axis of element 2, an inclined rear surface 22 and lateral surfaces 24 that are flat and parallel to each other. Besides, numeral 23 indicates the inner edge of flat frontal surfaces 21. On the outer portion of element 2, there are provided longitudinal guides 25 ending in elements 26 in the front area, which elements 26 possess rear surfaces 27 to be engaged by locking elements of the control ring to be applied on element 2, as described below. In its rear portion, element 2 additionally comprises a flange 28 possessing a front surface 29 and ending in a pipe-supporting sleeve 30 and an element 31 provided with an external thread. Elements 30 and 31 form a portion of a known pipe-compressing terminal with which the female portion of the joint in question is provided in the drawings.

With particular reference to the FIGS. 7 and 8, there is shown the control ring including an annular element 3 whose inner portion is provided with longitudinal guide elements 32, locking elements 33, elastic tangs consisting of a longitudinal section 34 and a radial section 35 connecting locking elements 33 to annular element 3, elastic elements 36 and lugs 37. The longitudinal elements of guides 32 end in their rear portions in surfaces 38, that should engage frontal surface 29 of flange 28, as described below.

On the inner side of each locking element 33, there is provided a frontal inclined surface 39 and rear surface 40, which is likewise inclined. Frontal inclined surface 39 and rear inclined surface 40 converge inwardly toward each other. Besides, in the frontal portion, surface 39 is followed toward the exterior by an inclined surface 41, which is substantially parallel to rear surface 40 and which thus converges forward in relation to surface 39. Inclined surface 41 is followed in the outer direction by a surface 42, which is radially perpendicular to the longitudinal axis of the ring. Surfaces 41 and 42 converge at a corner 43. Elastic elements 36 have the function of a return spring which holds the entire arrangement of the control ring thrust forward in the locking position. In known solutions, such spring is of metal and forms a separate component. On the other hand, in the solution provided by the present invention, such spring consists of elastic elements 36 that constitute an integral portion of control-ring arrangement 3. Elastic elements 36 end at their rear portions in rounded parts 45 engaging frontal surface 29 of flange 28, as described below.

Lugs 37 arranged in the frontal inner portion of annular element 3 of the control ring are provided with frontal end surfaces 46, that should engage rear surfaces 27 of elements 26, as mentioned above and as described below.

The reciprocal arrangement of all the elements provided inside annular element 3, i.e.; longitudinal guide elements 32, elastic tangs 34–35, locking elements 33, elastic elements 36 and lugs 37 is such that the elements can be made of plastic by means of injection molding. This produces a single part comprising various elements that form the joint, which makes it possible to reduce the components of the joint to a minimum.

In addition to reducing the number of components to a minimum, the solution of the present invention also allows a very simple and rapid assembly that does not require special tools.

Figure 2:
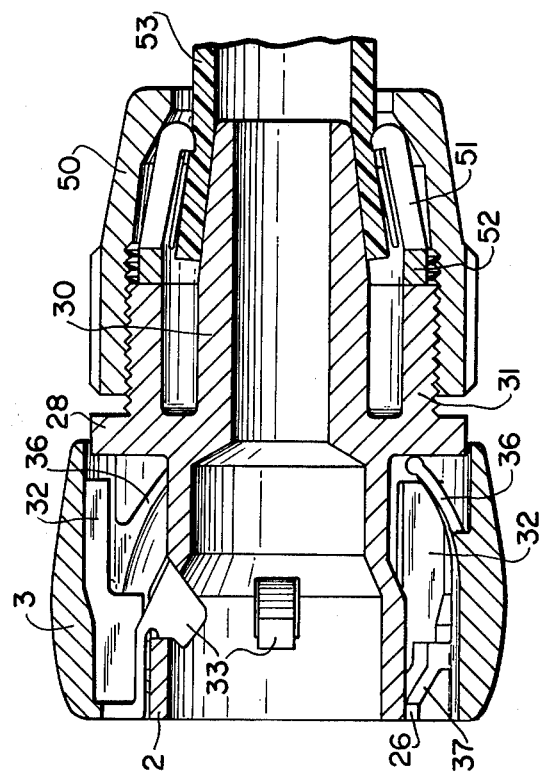
FIG. 2 is a view in section along the line I—I of FIG. 3 through the female part provided with the control ring.

Besides, the assembly merely concerns the arrangement of control ring 3 on inner element 2 of the female part. Such arrangement is obtained simply by slipping control ring 3 on inner element 2 of the female part. In order to facilitate the operation, one can also use an element having, e.g., an ogival (or conical) shape, which is placed beforehand on inner element 2, clearly seen in FIG. 4. The ogival element is indicated in this figure by a discontinuous line. It follows very clearly that, by pushing control ring (3) toward inner element 2 of the female part, elastic elements 36, locking elements 33 and lugs 37 on encountering the inclined outer surface of the ogival element are pushed outward until reaching the outer surface of element 2. In view of the reciprocal position of various inner elements 33, 36 and 37 of ring (3) and external elements 25, 26 of element 2, the coupling between ring 3 and element 2 can take place only in the precise position of insertion. If ring 3 is then slid on element 2 until ends 45 of elastic elements 36 encounter frontal surface 29 of flange 28, lugs 37 pass over elements 26 and are elastically deformed in outward directions but, as soon as such elements are transversed, portions 37 are returned inwardly owing to which their frontal surfaces 46 engage inner surfaces 27 of elements 26, thus effecting locking of ring 3 on element 2 without possibility of slipping off therefrom. At the same time, also locking elements 33 enter through holes 20 provided in the walls of element 2 and are pushed inward by elastic tangs 34–35. The entire female part is thus completely assembled and ready for operation, as seen in FIG. 2.

The operation of the joint of the invention illustrated in the various phases shown in FIGS. 9, 10 and 11, and the operation thereof will now be described:

When element 1 of the male part is inserted inside inner element 2 of the female part, frontal portion of element 1 encounters first of all inclined frontal surfaces 39 of locking elements 33, owing to which such locking elements 33 are pushed outwardly. As the insertion is continued, such locking elements 33 slide on the outer surface of first section 7 with a slight pressure, in view of the small diameter of such section 7, which reduces the friction of such elements 33 against sealing ring 13, which friction could damage ring 13.

Figure 9:
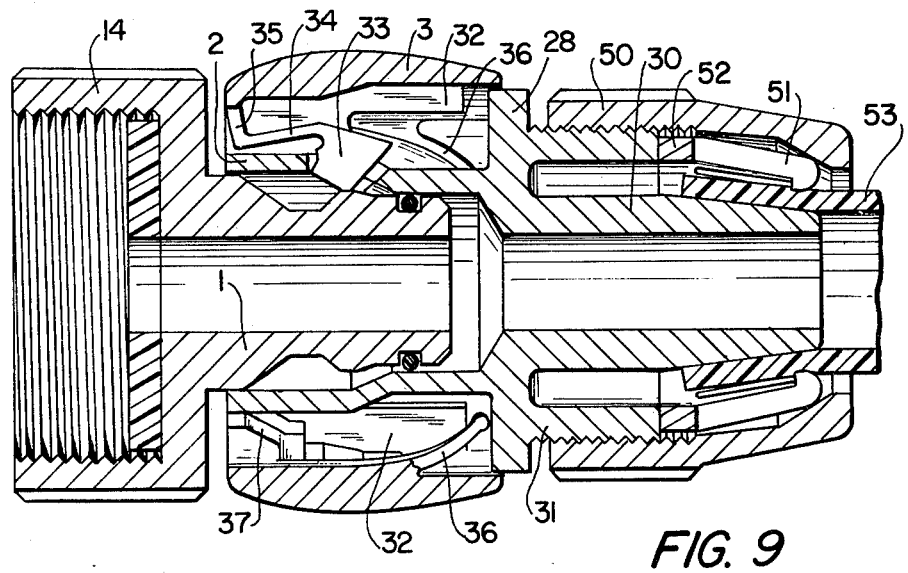
FIG. 9 is a section of the male and female parts, as shown during the coupling.

After such first section 7 is traversed, elements 33, reaching the surface which joins such first section 7 to following section 8, are pushed further outwardly until they reach the position on such second section 8, as illustrated in FIG. 9. As the insertion is continued until the entire element 1 is completely inserted in element 2, locking elements 33, pushed inward by elastic tangs 34–35, enter annular groove 10 of element 1, thus securing the locking of the male part in relation to the female part of the joint. This position is shown in FIG. 10.

On the other hand, when the parts are to be released, it is necessary to act on control ring 3 by pushing the latter toward the rear portion of the female part (which is the portion situated oppositely to the portion into which the male part is inserted). As such control ring 3 is pulled backward until rear surfaces 38 of longitudinal guide elements 32 meet frontal surface 29 of flange 28, elastic elements 36 are bent and, at the same time, locking elements 33 are displaced backward and abut with their inclined surfaces 40 against rear inclined surfaces 22 of through holes 20, which pushes elements 33 outwardly and allows the uncoupling of the two parts of the joint. This last operation is clearly shown in FIG. 11.

Figure 10:
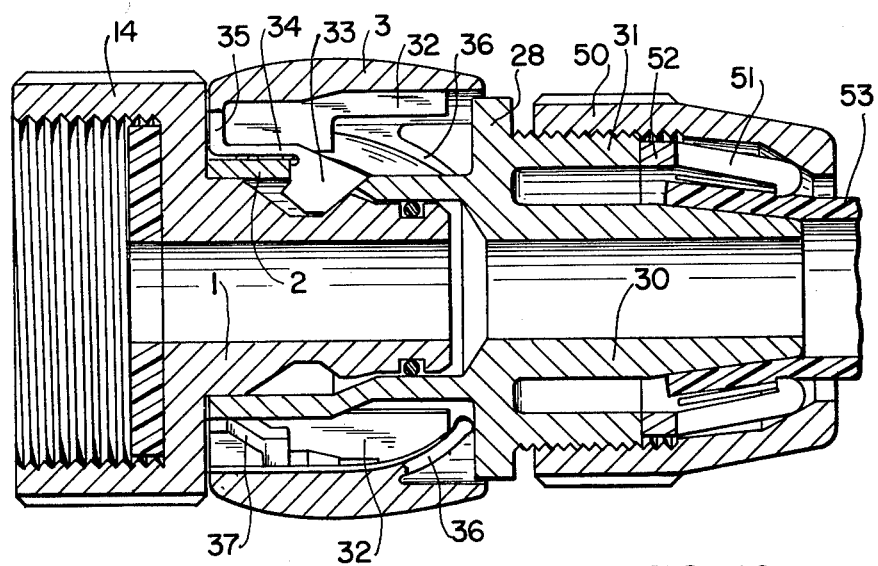
FIG. 10 is a view similar to FIG. 9, but representing the joint in the coupled position.
Figure 11:
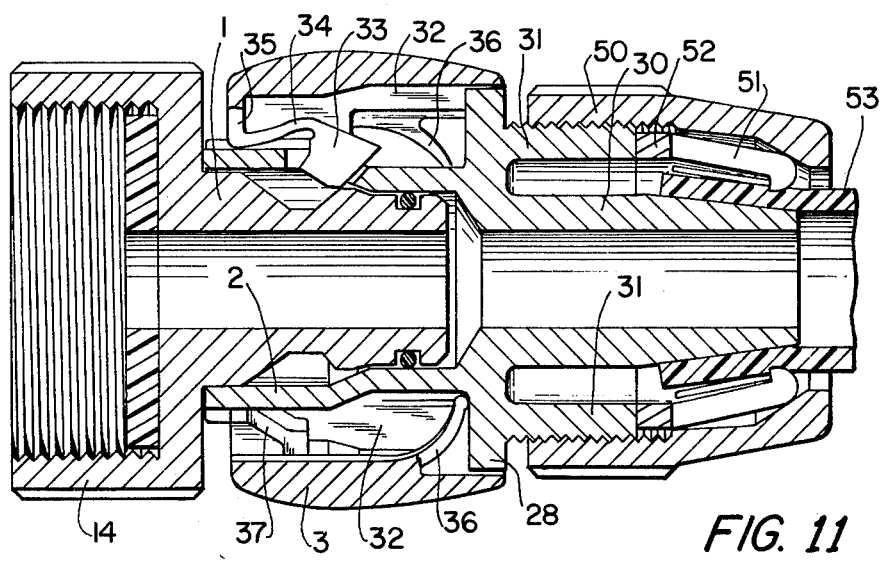
FIG. 11 is a view similar to FIGS. 9 and 10, but showing the joint during uncoupling
Figure 12:
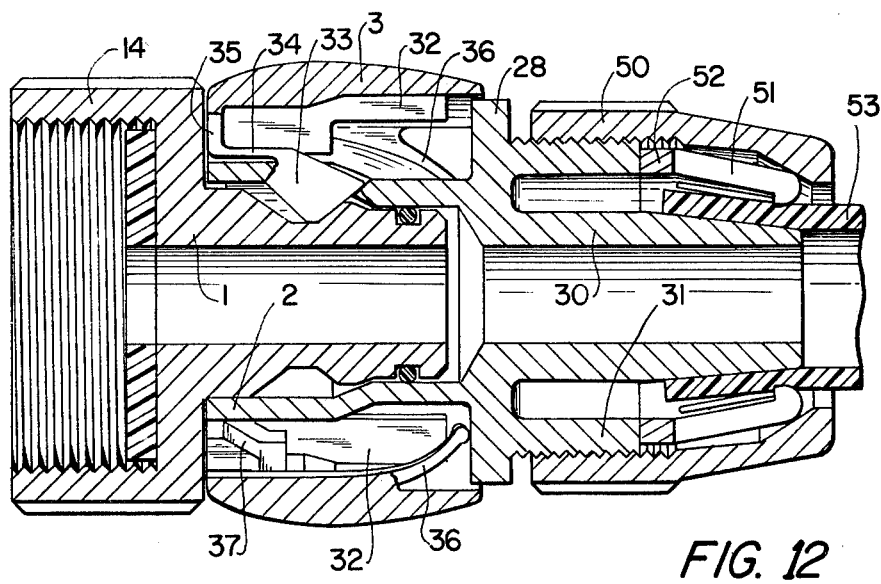
FIG. 12 is a view similar to FIG. 10 but illustrating a possible modification of the joint.
Figure 13:
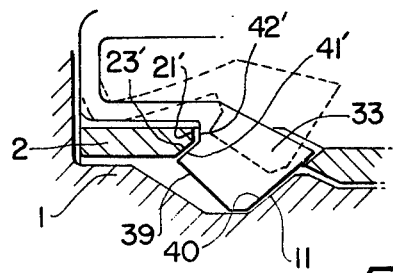
FIG. 13 is an enlarged detail, in section of the modification of FIG. 12.

When one refers especially to FIG. 10 and also to FIGS. 5 and 7 for the details drawn and indicated with greater clarity therein, one can see the manner in which the male part and the female part of the joint are reciprocally locked in the coupling position. In fact, any axial force that could bring about the uncoupling will subject rear surfaces 40 of locking elements 33 to a thrust perpendicular to such surfaces. Locking elements 33 will transmit such thrust to inner edge 23 of through holes 20 against which they abut with corner 43. Also surfaces 42 of such elements 33 engage surfaces 21, thus reducing the specific pressure between the parts in contact. Locking elements 33 are prevented by the presence of inclined surface 41 from sliding outwardly. The same takes place in the case of the embodiment shown in FIGS. 12 and 13. Edge 23 of this embodiment is replaced by an inclined surface 23' and the design of locking elements 33 and through holes 20 is additionally modified in such a manner that the frontal portions of locking elements 33 do not project inside element 2. Besides, in FIG. 13, reference numerals 21', 41' and 42' indicate details equivalent to those indicated by 21, 41 and 42 in FIGS. 5 and 7. It can be noted also here that, in the case where the joint is subjected to uncoupling stresses, locking elements 33 are pushed forward, owing to which any radial stressing which could push such locking elements 33 outward is cancelled by the fact that surfaces 41' engage surfaces 23'. It can be seen that the diameter of inner cylindrical area 17 in element 2 of the female part, which is smaller than that of inner cylindrical area 18, makes it possible to shift outward the area on which locking elements 33 (edge 23 or inclined surface 23') are pushed when the joint is subjected to uncoupling stresses, the force stressing such locking elements 33 thus being able to pass through such area or certainly very closely to it. This avoids or at least reduces to a minimal extent the possible torque which would tend to rotate locking elements 33 outward and could render the coupling unreliable.

Finally, as mentioned above, the female part is equipped, e.g., with a pipe-compressing end. This is a known arrangement and will not be described in detail here. In addition to above-mentioned pipe-supporting sleeve 30 and externally threaded element 31, such end possesses the following components: a clamping ring 50 and elastic tangs 51 provided on a ring 52. Besides, numeral 53 indicates the flexible pipe-supporting sleeve 30.

It can be noted that the outer surface of control ring 3 does not possess any projecting areas that could strike obstacles possibly present and bring about undesirable release of the coupling when the flexible pipe sections are dragged along the ground. In order to improve engagement by hand, it is possible to provide recesses on the frontal portion of such surfaces, without thus producing portions or areas that could engage obstacles possibly present.

From the above description and the drawings it clearly follows that the joint of the invention is made of the smallest possible number of components, that can be produced in very simple manner through injection molding of plastic, the joint requiring a single, fast and very simple operation of assembly involving only two components of the female part, the operation of the joint being secure and very reliable.

It can be noted that some elements provided on control-ring element 3, e.g., elastic elements 36, can be provided on inner element 2 of female part rather than on element 3. The two embodiments described and illustrated with preference combine all elastically operating elements in a single component, i.e. ring 3. This makes it possible to make such components of plastic having suitable elastic properties, while the other two components, inner element 2 of the female part and element 1 of the male part can be made of any plastic comprising no special properties and can thus be less expensive.

Of course, the present invention is not restricted to the embodiments described and illustrated. There are many possible variants of execution within reach of an average technician, without thus departing from the scope of the present invention.

What is claimed is:

1. A rapid coupling and uncoupling joint for connecting and disconnecting flexible pipes, said joint comprising:
   a male part having an outer surface with an annular groove therein;
   a female part having an inner surface dimensioned to receive said male part, said female part having radially extending therethrough a plurality of holes;
   a control ring comprising an annular element positioned externally of and surrounding said female part and displaceable axially only with respect thereto, said annular element having a first end facing toward said male part and a second end facing away from said male part, when said male part is inserted into said female part;
   said annular element having integral with an inner surface thereof, at positions adjacent said first end, a plurality of flexible tangs including radially inwardly extending first portions and second portions extending axially from said first portions toward said second end;
   said tangs having integral with free ends of said second portions thereof a plurality of locking elements positioned to extend through said holes in said female part and into said annular groove in said male part when said male part is inserted into said female part, to thereby lock said male part in said female part and to prevent relative axial displacement therebetween;
   said annular element having integral with said inner surface thereof elastic member means positioned to elastically abut said female part when said male part is locked in said female part and to urge said annular element in a first axial direction toward said male part;
   whereby manual axial movement of said annular element with respect to said female part, in a second axial direction opposite to said first axial direction, will cause flexing of said elastic member means and radial outward flexing of said tangs to allow radial outward movement of said locking elements from said annular groove, thus unlocking said male part and allowing withdrawal thereof from said female part; and
   said annular element, said tangs, said locking elements and said elastic member means being formed as a single integral piece of molded plastic material.

2. A joint as claimed in claim 1, wherein said female part has extending outwardly therefrom exterior projections, and said annular element has integral with said inner surface thereof elastic lugs positioned to engage said exterior projections when said male part is locked in said female part.

3. A joint as claimed in claim 1, wherein said elastic member means extend from said inner surface of said annular element axially toward said second end thereof and curve radially inwardly thereof.

4. A joint as claimed in claim 1, wherein said female part has on an outer surface thereof axially extending guides, and said annular element has integral with said inner surface thereof axially extending guide elements engaging said guides.

5. A joint as claimed in claim 1, wherein each said locking element includes first and second radially inwardly inclined surfaces converging toward each other toward the interior of said annular element, a third inclined surface extending outwardly from said first inclined surface in a direction parallel to said second inclined surface, and a fourth surface extending radially inwardly from said third inclined surface.

6. A joint as claimed in claim 5, wherein said first, third and fourth surfaces face toward said first end of said annular element, and said second surface faces toward said second end of said annular element.

7. A joint as claimed in claim 6, wherein each said hole in said female part has a front radial surface with an inner edge and a rear inclined surface, and when said male part is locked in said female part, said second inclined surface of said locking element engages said rear inclined surface of said hole, said fourth surface of said locking element engages said front radial surface of said hole, and said inner edge of said front radial surface of said hole engages said third inclined surface of said locking element.

8. A joint as claimed in claim 7, wherein the area of engagement between said fourth surface and said front radial surface is positioned radially outwardly of the area of engagement between said second inclined surface and said rear inclined surface.

* * * * *